United States Patent [19]
Cole

[11] 3,963,567
[45] June 15, 1976

[54] ELECTROLYTICDIALYSIS
[76] Inventor: Marc Cole, 1057 C Argyll Circle, Lakewood, N.J. 08701
[22] Filed: Jan. 9, 1975
[21] Appl. No.: 539,632

[52] U.S. Cl. .............................. 204/180 P; 204/128; 204/151
[51] Int. Cl.² ........................ B01K 5/00; C02B 1/82
[58] Field of Search ............... 204/151, 180 P, 128, 204/129

[56] References Cited
UNITED STATES PATENTS

| | | |
|---|---|---|
| 2,636,852 | 4/1953 | Juda et al. .......................... 204/151 |
| 2,752,306 | 6/1956 | Juda et al. .......................... 204/151 |
| 3,214,362 | 10/1965 | Juda .................................. 204/151 X |
| 3,669,857 | 6/1972 | Kirkham et al. ............... 204/180 P X |

Primary Examiner—John H. Mack
Assistant Examiner—A. C. Prescott

[57] ABSTRACT

Sea water is deionized with simultaneous production of caustic soda, chlorine, and hydrogen by a novel electrodialysis process wherein sodium and chlorine ions are separated from said sea water, and said ions, while separated from each other, are electrically discharged.

11 Claims, 6 Drawing Figures

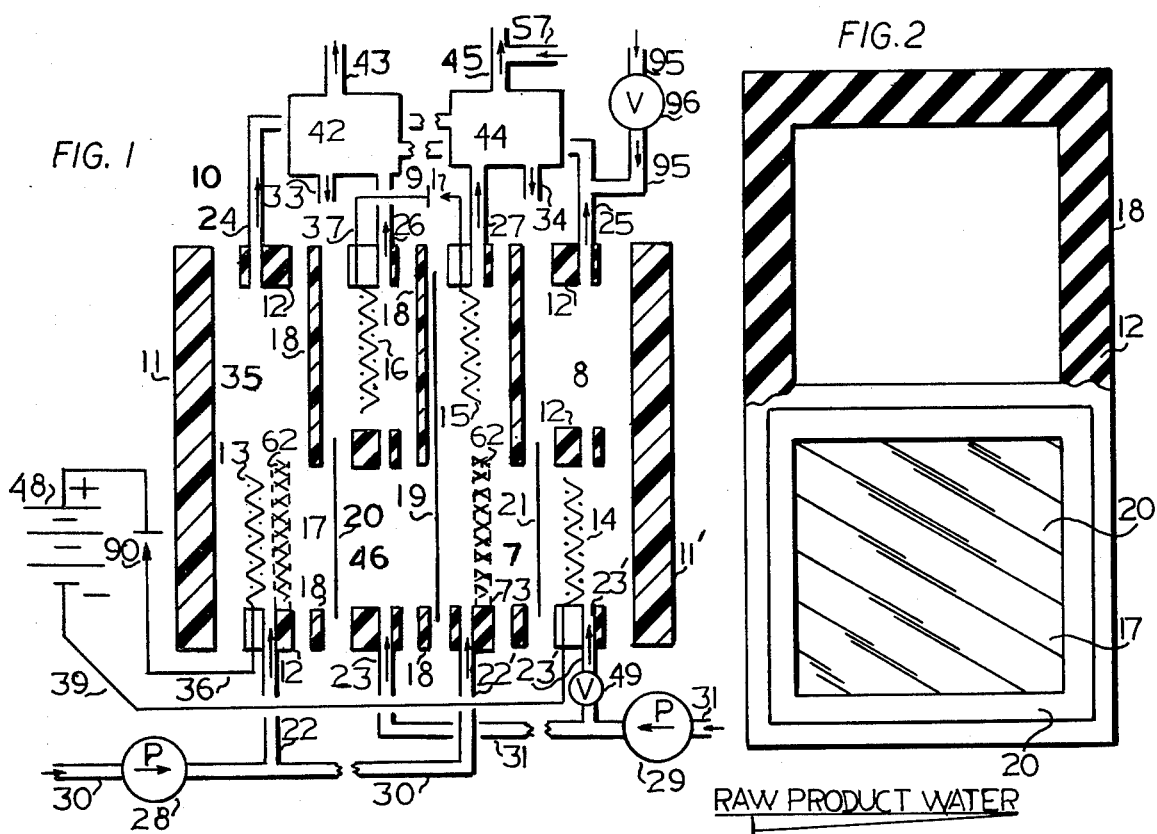
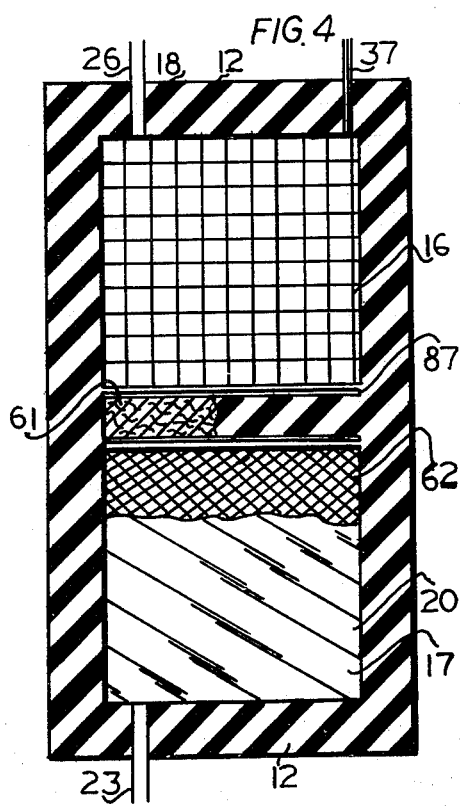
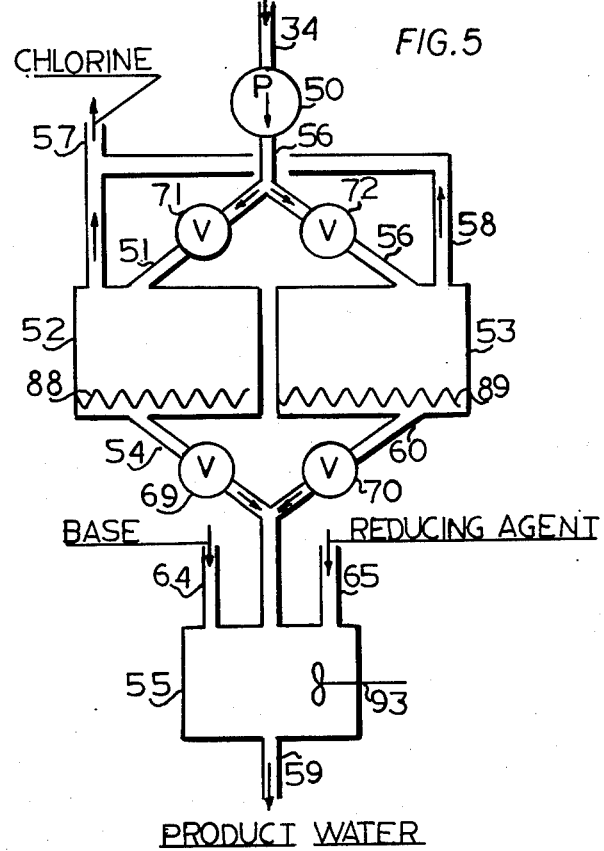

ELECTROLYTICDIALYSIS

BACKGROUND

For economic reasons electrolysis of dilute brines such as sea water or brackish water is not practicable. This is especially true for exhaustive electrolysis to produce deionized water.

In ordinary electrodialysis, on the contrary, brackish water of 2000 or 3000 parts per million of salt is economically desalinated; but sea water at 35,000 ppm of salt is more economically desalinated by, for example, one of the forms of distillation.

I have invented a novel form of electrodialysis whereby it is economical to desalinate sea water, since, in addition to deionized water, caustic soda, chlorine, and hydrogen are produced. The value of the caustic soda and chlorine produced is such as to more than defray the entire cost of my novel form of electrodialysis.

In contradistinction to all processes for desalination, costs for which are borne by the deionizd water produced, my new form of electrodialyis prmits economical production of deionized water not only for domestic and industrial use but for use in agriculture as well.

SUMMARY AND OBJECTS

In the usual form of electrodialysis, sodium and chlorine ions are separated by cationic and anionic membranes respectively from the brine being treated. Said ions are, however, reunited to form a concentrated brine, so that all solutions remain electrically neutral.

In contradistinction, I have found that it is possible to maintain electric neutrality in all solutions by electrically mutually discharging the separated sodium and chlorine ions as separate entities. The sodium atoms so formed react with water to form caustic soda and liberate a stoichiometric weight of hydrogen; the chlorine atoms so formed mainly unite to form diatomic chlorine.

I achiee the said electrical mutual dishcarge by using a pair of electrodes, which I call secondary electrodes to distinguish the secondary electrodes from the usual electrodes found in the end compartments of the usual electrodialytic cell. Said end electrodes I call primary electrodes. The said secondary electrodes are placed in compartments into which sodium and chlorine ions are separated electrodialytically, and the secondary electrodes are merely connected, externally to the electrodialytical cell, by an electrically conductive wire. The mutual electrical discharge of the sodium and chlorine ions results in maintenance of electrical neutrality in all solutions.

In a further innovation over the usual form of electrodiallysis, I have found that, in contradistinction to the use of anionic or neutral membranes, I eliminate said membranes, and use only a cationic membrane. Since it is the anionic membrane which is mainly involved in fouling in the usual electrodiallytic cell, the said innovation results in considerable improvement in my new electrodiallytic process.

In order to avoid excessive distortion of the electric field produced by the primary electrodes, I prefer to place the secondary electrodes somewhat outside the path of the said electric field between the primary electrodes. For the same reason, it is preferred to pulse the two circuits in an out of phase manner— that is, to interrupt the current in the circuit between the secondary electrodes at a time when the circuit between the primary electrodes is complete and carrying current, and vice versa. However, as will be shown, mutual electrical discharge of the separated sodium and chlorine ions may be achieved when the secondary electrodes are within the path of the electric field created by the primary electrodes, and without the said pulsing.

The present invention is not limited to the electrodialysis of sea water but may be applied to electrodialysis of any solution of an electrolyte. For purposes of this application a solution of an electrolyte is defined as any solution which conducts an electric current.

The present method uses the charges appearing on the ions of dissolved substances as a means for segregating ions of one charge from ions of the opposite charge. In this respect is the present method similar to present electrolysis or electrodialysis methods.

In electrolysis, an electric field separates ions thru a porous diaphragm or an ion selective membrane, and D.C. voltage impressed directly on the segregated ions effects the mutual electrical discharge of said ions. In present electrodialysis methods an electric field segregates ions thru ion selective membranes in such manner that the segregated ions mutually electrically discharge themselves by direct contact. The result is that the salt originally present in the electrolyte solution undergoing electrodialysis concentrates in one portion of said solution while the remainder of said solution is depleted of said salt to a corresponding degree.

The method of this invention differs markedly from both the above methods used to separate ions in solution.

The present inventor has discovered that if ions of the same charge are separated from ions of the opposite charge in a solution of an electrolyte thru an ion selective membrane by means of an electric field, the said separated groups of ions of the same charge may be mutually electrically discharged by electrically conductive means, said last means impressing no voltage of their own on the said groups of ions.

The specific difference of the present method from that of electrolysis and electrodialysis and the advantage of the present method lies in the fact that in electrolysis and electrodialysis ion concentration of the said electrolyte solution undergoing present processes of electrolysis and of electrodialysis is largely determinant of energy requirements, which is also true of the new electrolyticdialysis process; all three processes obey the laws of Faraday and Ohm. However, whereas electrolysis, because of energy requirements, is used primarily in the splitting of the solute or solvent or both of an electrolyte solution, and whereas electrodialysis, because of energy requirements, is used primarily for the change in concentration of the solute of an electrolyte solution, the new electrodialyticdialysis process is practicable, from an energy requirement basis, both in the splitting of the solute of an electrolyte solution and a change in the concentration of the solute of said solution; for in electrodialysis as well as in electrolyticdialysis, as opposed to electrolysis, energy required may be decreased by an increase in the number of functionally joined cells of a multi-cell unit, as discussed on page 235 of a volume edited by K. S. Spiegler titled "Principles of Desalination" 1966, Academic Press, N.Y.

A further discussion of current, voltage, and energy requirements for electrodialysis, also applicable to electrolyticdialysis is given starting on pages 225, 234, and 241 respectively of the above cited volume.

By the term "functionally joined" cells, as regards this application, is meant cells joined in such manner that each said cell is dependent, for functioning, on the functioning of its neighbor in the electrolyticdialysis manner of this invention, as may be ascertained by reference to FIGS. 3 and 6; in the case of the single cell of FIG. 1 and of the end cells of FIGS. 3 and 6, said single and end cells, respectively, are functionally joined to the end compartments, or half cells, of FIG. 1, and of FIGS. 3 and 6, respectively. Thus, the said single and end cells depend on the said half cells to function in the electrolyticdialysis manner.

The term "electrolyticdialysis," coined to denote the unique functions of this invention, distinguishes, on the one hand, from electrolysis by the presence of multiple cells, functionally joined, and with a common electric field, and, on the other hand, from electrodialysis by the fact that lysis of the solute is a function of electrolyticdialysis as contrasted with merely concentrating and diluting said solute as in the usual electrodialysis.

The new electrolyticdialysis process is of advantage over electrolysis for use in dilute electrolyte solutions, such as, for example, sea water, because of the potential ability to control energy requirements, and is of advantage over electrodialysis processes because, for approximately the same energy expenditure, dialysis and lysis are performed on the solute of an electrolyte solution. In addition, direct impressment of D.C. voltage on an electrolyte solution favors formation of impurities thru, for example, water splitting, when solute splitting of said solution is desired. Said impurities are avoided in the electrolyticdialysis process.

It is therefore, a primary object of this invention to provide a practicable method for the simultaneous electrodialysis and electrolysis of the solute of a solution of an electrolyte.

Another object of this invention is to improve the value of the solute of an electrolyte solution by recovery of the components of said solute in desirable forms, while simultaneously deionizing the said electrolyte solution, both said processes using the same energy on an economical basis.

It is an object of this invention, furthermore, to provide a process and apparatus for the simultaneous production of deionized water, caustic soda, chlorine, and hydrogen from sea water by electrodialytic means.

A further object of the invention is to produce deionized water at a cost that makes it possible to use said water for agriculture on an economical basis, from sea water.

Another object of my invention is to provide a process and apparatus to utilize the readily available common salt present in the sea for the competitive production of caustic soda and chlorine.

Whereas the energy consumed in my novel electrodialytic process for the production of caustic soda and chlorine is approximately equal to the energy consumed in currently used electrodialysis processes for the production of desalted water, all processes being subject to Faraday's and Ohm's laws, and whereas in my novel electrodialytic process deionized water is simultaneously produced with the same expenditure of energy required in said chemicals production, it is hence a further object of this invention to conserve energy in the simultaneous production of the said several basic commodities.

Still another object of my invention is to provide an apparatus which will resist the corrosive action of the products herein formed.

With the above and other objects in view, as will be presently apparent, the invention comprises a process and apparatus which will be presently described and properly claimed.

Reference may be had to the accompanying drawings, wherein:

FIG. 1 is a diagrammatic representation on a longitudinal center-line cross-section of a single electrodialytic cell illustrating the present invention in its simplest form, in which the elements of said cell are separated for clarity.

FIG. 2 is a diagrammatic view of a method of securing dialytic membranes to cell walls of the cell of FIG. 1, at the windows cut in said walls.

FIG. 4 is a sectional view, taken on a plane of line 4—4 of the electrodialytic unit of FIG. 3.

FIG. 5 is a schematic flow diagram illustrating treatment of raw product water from cells of the electrodialysis units of FIGS. 1, 3, and 6.

Figure 3:
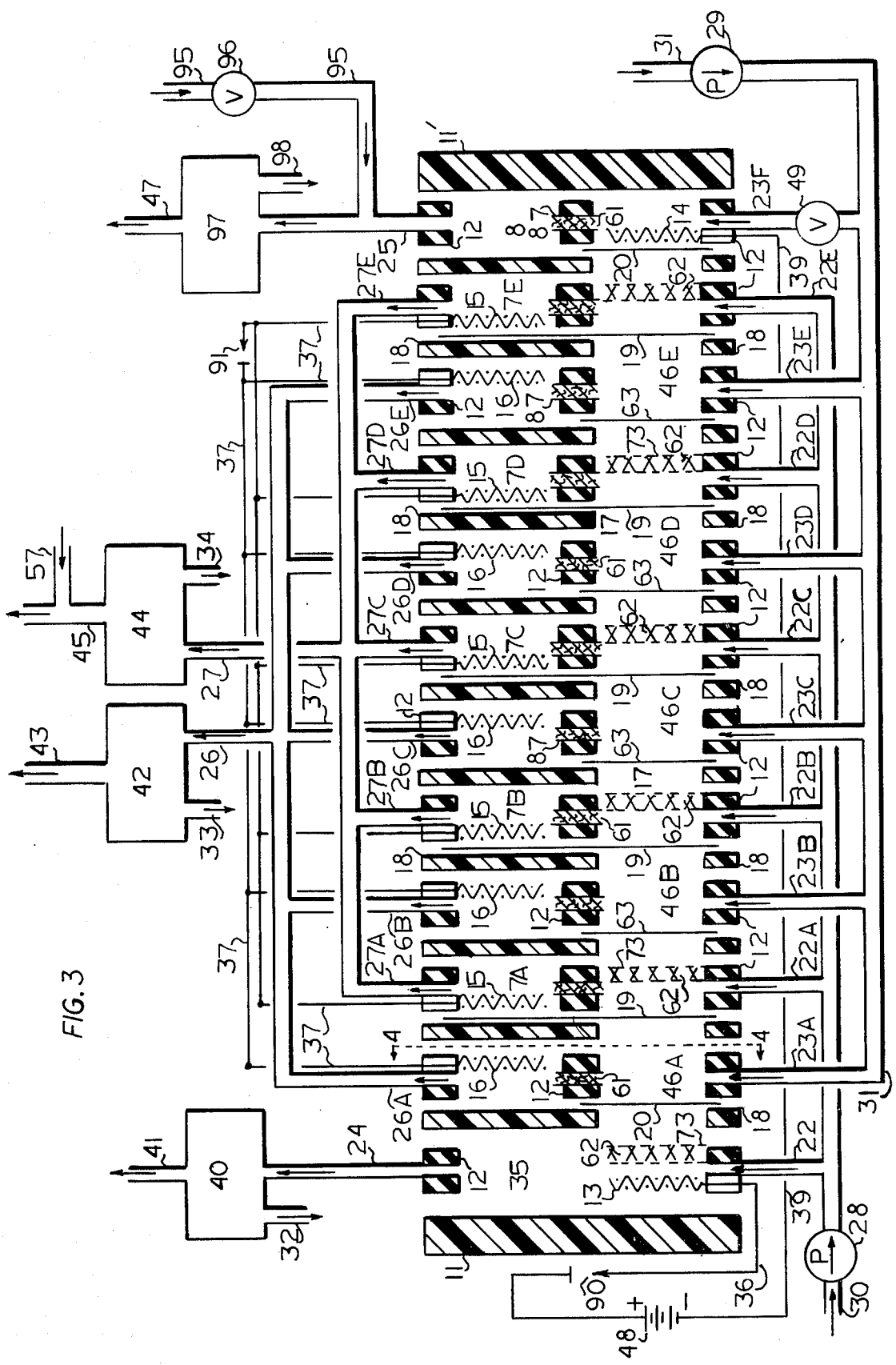
FIG. 3 is a diagrammatic representation on an elevational cross-section of a plurality of the electrodialytic cells, one of which is represented in FIG. 1, assembled into a single exploded unit, said cells being functionally joined.

Reference is made to FIG. 1, which discloses a basic and simplified embodiment of the process and apparatus of the present invention. Numeral 10 represents a single composite cell of the novel electrodialysis presented. End walls 11 and 11' delimit the adjunct end compartments 35 and 8 of cell 10. Compartments 46–7 comprise said cell proper.

The rubber gasket 12, which may be made of Viton or other chlorinated elastomer, seal each of the compartments 35,46,7, and 8 of cell 10. Gaskets 12 function to secure the cationic membranes 20 and 21, and to secure the ion impervious partition membrane 19, as is detailed in FIGS. 2 and 4, discussed below, for membrane 20.

Tubes 22 and 22' transport saline solution into compartments 35 and 7 rspectively, and tubes 23 and 23' transport recovered water, defined below, into compartments 46 and 8 respectively; and all of the said tubes pass thru gaskets 12. Tubes 24 and 27 transport a mixture of chlorine and saline solution out of compartments 35 and 7 respectively, and tubes 26 and 25 transport a mixture of hydrogen and caustic soda out of compartments 46 and 8 respectively, said tubes passing thru gaskets 12.

Gaskets 12 also function as seals in passing electrically conducting wires 36 and 39 to primary electrodes 13 and 14 respectively, and in passing electrically conducting wire 37 from secondary electrode 16 to secondary electrode 15 of the cell 10.

The cationic membranes 20 and 21 are preferably, for the single composite cell 10, Nafion, a Du Pont Co. corrosion resistant membrane.

The cell 10 compartment walls 18 have windows 17 cut out so that membranes 20, 21 and 19 seated on said walls, will overlap the perimeters of said windows. Areas of all windows 17 are approximately equal.

Altho many saline solutions may be treated by the novel electrodialysis process described, sea water is taken as a typical aline solution. Filtered sea water, from which the slightly soluble salts of the metals iron, manganese, calcium, and magnesium have been removed by conventional means, or to which enough hydrochloric acid is added to hold the said metals in solution during electrodialysis, is pumped by pump 28 thru line 30 into tubes 22 and 22'. Recovered water, defined as mentioned, below, is pumped thru line 31 by a pump 29 into the tubes 23 and 23'.

Effluents from compartments 35 and 7 are received in the liquid gas separator 44. Chlorine gas issues from said separator via a pipe 45, and a brine, lower in salt content than sea water, issues from separator 44 via pipe 34.

Effluents from compartments 46 and 8 are received in the liquid gas separator 42. Hydrogen gas issues from said separator via a pipe 43, and caustic soda solution issues from separator 42 via a pipe 33.

Treatment of said liquid and gaseous effluents will be outlined below. Separators 44 and 42 may be of conventional design.

A primary anode 13, made preferably of ruthenium oxide coated titanium screen, is positioned in compartment 35 aposite to membrane 20. Areas of primary and secondary electrodes are each about equal to those of membrane 20 and membrane 21 individually.

A primary cathode 14, made preferably of stainless steel screen, is positioned in compartment 8 aposite to membrane 21. Wire 36 connects the positive pole of D.C. voltage source 48 with anode 13, and the negative pole of source 48 is connected by wire 39 to cathode 14. A pulse generator 90 is preferably used to pulsate the current to electrodes 13 and 14.

A secondary cathode 16, made preferably of stainless steel screen, is positioned in compartment 46 upstream of membrane 20, with preferably some space between the lower edge of said electrode and the upper edge of said membrane.

A secondary anode 15, made preferably of ruthenium oxide coated titanium screen, is positioned aposite to cathode 16, in compartment 7. As mentioned, a wire 37 connects electrodes 16 and 15.

A pulse generator 91 is preferably used to pulsate the current in wire 37; pulses from generators 90 and 91 should alternate, so that when current flows in wires 36 and 39, no current flows in wire 37, and vice versa. Thus the pulse generators 90 and 91 may be current interrupters which are commercially available.

Anode 15 in compartment 7, is placed upstream of membrane 21, with preferably some space between the lower edge of said electrode and the upper edge of said membrane.

Membrane 19, as mentioned, does not allow passage of ions thru said membrane. Membrane 19 is a dielectric plastic, such as polypropylene or teflon, which does allow passage of an electric field thru said membrane. Dimensions of membrane 19 are immaterial provided only that said membrane 19 completely covers the window 17 in the wall 18 which separates compartments 46 and 7.

Spacer elements 62, supported by brackets 73, determine the flow of liquid along membranes 20 and 21; elements 62 may be of tortuous path or sheet flow design, and are described in chapter 6, page 249, of "Principles of Desalination" edited by K. S. Spiegler, 1966, Academic Press, N.Y.; said elements are commercially available.

Bolts (not shown) running thru holes in the end walls 11 and 11; are used to clamp the entire assembly of cell 10 in water tight fashion.

The structural elements of cell 10, such as the said tubes, pipelines, walls and brackets may be made of corrosion resistant plastic such as polypropylene, polyvinylchloride, teflon or the like. Both pumps 28 and 29 may be made of stainless steel.

The valves 49 and 96 and pipe 95 are used only in the start of the operation of cell 10. Chlorine inlet pipe 57 is an extension of the pipe 57 of FIG. 5, and will be mentioned in connection with the operation of the apparatus of FIG. 5.

To start operation of cell 10, compartments 35 and 7 are filled by pump 28 with sea water, treated as described, compartment 46 is filled by pump 29, with valve 49 closed, with recovered water, the origen of which will shortly be described, and compatment 8 is filled with dilute caustic soda solution at a concentration of about two or three percent sodium hydroxide or with distilled water. The last said liquids may be added to compartment 8 manually thru pipes 95 and 25 with valve 96 open; after which valve 96 is closed and valve 49 is opened.

As will be recognized in the following description of the operation of cell 10, the present inventor has discovered that electrodialysis will proceed readily if dialyzed ions of opposite charge are mutually electrically discharged by means of electrically connected electrodes, instead of the usual manner in which said ions are electrically discharged by mutual contact in a solvent.

It should be noted that the ion impervious membrane 19 is placed to partition the single cell 10 into two compartments 46 and 7 so that only the direct current electric field flows between the two separated compartments 46 and 7 of cell 10.

If distilled water is used in compartment 8, instead of dilute caustic soda solution, at the said start-up, equilibrium will be achieved in a longer time after start-up.

The D.C. power from source 48 is now connected to cell 10,— and preferably pulsed by a circuit interrupter 90 for opening and closing the circuit to power source 48,— to primary electrodes 13 and 14. Preferably a similar mechanism 91, on wire 37 pulses the current which flows between secondary electrodes 15 and 16. The pulses between primary electrodes and those between secondary electrodes should be about equal in duration and the pulses should be out of phase, so that when current is flowing between primary electrodes, no current will be flowing between secondary electrodes— and vice versa. Frequency of pulses may be of the order of tenths of a second, but the actual frequency of pulsaton does not materially affect cell 10 operation, and in fact the single cell 10 has been operated satisfactorily with steady current between primary, and between secondary, electrodes repsectively.

The reason for the preference for pulsing currents, out of phase, between primary electrodes, and between secondary electrodes is that with said currents there appears to be less distortion of the electric field between the primary electrodes by the secondary electrodes, and this non-interference with the said electric field appears to improve operation of multi-celled units.

Pumps 28 for sea water and 29 for recovered water accounted for below, with valve 49 now opened, are activated to pump said liquids respectively at a slow rate, but steadily, thru the several compartments of cell 10 as depicted in FIG. 1. Said rate depends on the area of membranes 20 and 21 and the efficiency of spacer elements 62.

Hydrogen is immediately evolved from, and caustic soda is formed in, compartments 46 and 8, and chlorine is formed in compartments 35 and 7. The pH of the aqueous medium in compartment 46 rises rapidly to about 11, and the liquids in compartments 35 and 7 turn potassium iodide-starch paper a deep blue, indicative of the presence of chlorine. In addition, conductivity meter readings of the liquids in compartments 35 and 7 indicate a steady decrease in ion concentration in the said compartments. Analysis confirmed the presence of the said products in the said compartments.

Since partition membrane 19, polyproplyene, will allow passage of an electric field but is impervious to ion transport, the sodium ions in compartment 46 must be coming from the saline solution in ccompartment 35. Disconnection of the electrical contact wire 37 between electrodes 15 and 16, but with current flowing between primary electrodes 13 and 14 results in instant halt to hydrogen evolution in compartment 46; reconnection of said contact between electrodes 15 and 16 causes instant resumption of hydrogen evolution in compartment 46. In view of the above phenomena, and because there is no electrical connection between primary and secondary electrodes, it is evident that formation of caustic soda and chlorine is effected by electrodialysis and not by electrolysis; the heavy penalty exacted in power requirements when a dilute solution of a salt is electrolysed is thus avoided.

Similar to the manner whereby sodium ions pass thru cationic membrane 20 from compartment 35 to compartment 46, sodium ions pass thru cationic membrane 21 from compartment 7 into compartment 8.

The length of time that the liquids in the several compartments are in contact with the membranes in said compartments is a factor in driving the reactions in cell 10 to completion. Various so-called spacer elements 62 may be commercially obtained which increase contact time of the various solutions with their respective membranes; in addition these spacer elements improve turbulent flow at the membrane surface which aids in the functioning of cell 10. Further aid in the use of elements is detailed in the next paragraph, with respect to diffusion limitation.

In the cell 10 detailed, the cationic membranes used, as mentioned are Nafion, a perfluorsulfonic acid membrane which has the chemical stability of Teflon. Nafion has a life of three to four years but is costly. If desired, less costly cationic membranes are commercially available, but none of said less costly membranes is stable to wet chlorine and caustic soda. However, since the chlorine ions and sodium ions themselves are chemically inert, and since the secondary electrodes 15 and 16 in my process are preferably upstream of the said cationic membranes 20 and 21 of cell 10, it is possible to use the said less costly membranes, given numeral 63 shown in FIG. 3, if precautions are taken to limit diffusion of evolved chlorine and caustic soda counter-current to the direction of the stream of liquids entering cells 10 of the multi-cell electrodialysis unit of FIG. 3. The said less costly cationic membranes 63 may be made in accordance with the preparative techniques given on page 213 of chapter 6 in the volume entitled "Principles of Desalination" edited by K. S. Spiegler, 1966, Academic Press of New York. Properties of the commercial membranes 63 are given on page 207 of the above volume.

In addition to the use of spacer elements 62 which limit to a degree said diffusion, use of diffusion barriers 61, shown in FIGS. 4 and 3, made of fritted glass or glass wool is preferred for use with membranes 63. As noted above, at least some space is preferred between cationic membranes 20 and 21 of FIG. 1, or in the case of FIG. 3, between membranes 63, and secondary electrodes 15 and 16. It is in the said space that the diffusion barriers 61 are fitted. Since in the end compartments 35 and 8 there is an apposition of primary electrodes 13 and 14 and membranes 20 and 21 respectively, or in the case of FIG. 3, an apposition of electrodes 13 and 14 and membranes 20 respectively, use of Nafion membranes is preferred in said end compartments of both single and multicell units.

The effluents from compartments 35 and 7 of FIG. 1, containing chlorine, both as a gas and dissolved, and product water, run thru tubes 24 and 27 respectively into the liquid-gas separator 44. Chlorine gas separates in said separator and is led out of separator 44 by pipe 45, and said gas may be dried and compressed by well known methods. Product water leaves separator 44 by a pipe 34.

If the said product water is of sufficiently low salt content, but if the presence of dissolved chlorine and the reaction products of chlorine with water are objectionable, then a preferred treatment of said product water is as depicted in FIG. 5. Said deionizd product water is pumped by a pump 50 thru pipes 34, 56 and 51, with a valve 71 open and valve 72 closed, into a bed of activated carbon in absorber 5. The chlorine dissolved in said product water is absorbed on said carbon, and the said water is then led thru pipe 54 and open valve 69 into neutralizer-reducer 55; to container 55 is added, via pipe 65, an amount of reducing agent, such as sodium bisulfite, sufficient to reduces the hypochlorous acid present in the product water to hydrochloric acid. Then to container 55 is added, via pipe 64, an amount of a base, such as sodium hydroxide solution, sufficient to neutralize the hydrochloric acid present in said water. A stirrer 93 aids in the reactions in container 55. Finally the treated product water is piped via pipe 59 to a storage tank (not shown).

When the carbon in tank 5 is saturated with chlorine, said chlorine is expelled by heating said carbon with resistance heater 88, pipe 57 conducting the freed chlorine to pipe 45 of FIG. 1. Meanwhile, a twin unit 53 also containing activatd carbon and a heater 89 may be used by closing valves 71 and 69, and opening valve 72 and 70, product water from pump 50 then being directed thru pipes 56 and 60 thru tanks 53 and 55 for similar treament. Chlorine liberated from tank 53 is led via pipe 58 to pipe 57 and thence to pipe 45.

If the product water effuent from separator 44 is judged to have too high a salt content, further treatment of said product water will be discussed with reference to FIG. 3.

The neutralization and reduction in tank 55 may be monitored by pH and redox meters respectively. Sampling of product water for test purposes may be taken thru a petcock (not shown) on outlet pipe 59.

The effluent from compartments 46 and 8, led thru tubes 26 and 25 respectively, containing caustic soda solution and hydrogen, goes to a liquid-gas separator 42, depicted in FIG. 1. Hydrogen gas separates in tank 42, and is conducted by pipe 43 to a storage tank (not shown).

Among the many uses for hydrogen, a preferred use is in the hydrogen-air fuel cell which would generate at least part of the D.C. power required in the present electrodialysis process.

Caustic soda solution is piped from separator 42 via a pipe 33, and may be evaporated in an evaporator shown) to a commercially acceptable concentration of 50 or 70%. The condensate from said evaporator, herein called "recovered water", is reused by pumping said recovered water via pipe 31 and pump 29 to compartments 46 and 8, valve being open. Additional water for compartments 46 and 8 may be obtained from stored product water as required.

The brackets 73 of FIG. 1 may be affixed to the walls 18 by any conventional method. Valves 49 and 96 may be operated manually or by conventional mechanical means. Pumps 28 and 29 may be motor driven.

The valves 71,69,72, and 70 of FIG. 5 may be manually or mechanically operated; and pump 50 may be motor driven. The stirrer 93 may also be motor driven.

With reference to FIG. 2, the gasket 12, pressed against wall 18, is cut away to show the overlap of membrane 20 along the perimeter of window 17. When the cell of FIG. 1 is assembled, pressure by the bolts, above referred to, will enable gaskets 12 to form water tight seals around membranes 20 and also walls 18 of said cell.

Referring to FIG. 4, the gasket 12 is shown sealing the upper edge of membrane 20, at the upper end of window 17. The influent tube 23 is shown extending thru a lower segment of gasket 12, and the effluent tube 26 extends thru an upper segment of said gasket. Electrode 16 is housed in a space, formed by gasket 12, in the upper half, approximately, of the area of the wall 18; electrode 16 is connected to wire 37 which extends thru an upper segment of gasket 12. In a space between said electrode and membrane 20 is a diffusion barrier 61 supported by bracket 87; said barrier and bracket are depicted in FIG. 3. Barrier 61 is depicted as being constructed of packed fiber, and is cut away to show part of gasket 12 underneath said barrier. Over membrane 20 is fitted spacer element 62. Element 62 has been cut away to show said membrane underneath the element 62. The spacer element 62, electrode 16, and diffusion barrier 61 with bracket 87 are all dimensioned to fit within the spaces created by gasket 12 when the electrodialysis unit of FIG. 3 is bolted together. As mentioned, FIG. 4 is a sectional view, taken on a plane of line 4—4 of FIG. 3. The fiber of barrier 61 may be spun glass.

Reference is made to FIG. 3, assuming the influent to be sea water, wherein the main thrust is to depict the method whereby the cell proper 46—7 of FIG. 1 may be replicated in a multi-cell electrodialysis unit embodying the novel features of the present invention. In FIG. 3, the replicated cell proper 46—7 compartments are identified by the same figure number but followed by the letters A,B,C etc. It should be noted that multi-cell units of the type of FIG. 3 are not limited to the number of cells shown in FIG. 3, but that on the contrary, hundreds of said cells may be used in a single multi-cell unit of the type of FIG. 3. All cells in FIG. 3 are functionally joined.

It will be noted that for the end adjunct compartments 35 and 8 cationic membranes 20 are preferred and used; but that for the cell proper compartments 46B—7A, 46C—7B, 46D—7C etc. the less costly cationic membranes 63, protected by diffusion barriers 61, are used.

In the end compartments 35 and 8, because of D.C. power to the primary electrodes 13 and 14 some water splitting occurs the products of which contaminate the effluents of the said end compartments. For this reason, the effluent from compartment 35 is led by tube 24 to a separate liquid-gas separator 40. The chlorine issuing from pipe 41 may, if the said chlorine is considered to be of sufficiently high purity, be combined with the chlorine issuing from pipe 45 of separator 44; otherwise chlorine from pipe 41, together with liquid effluent from pipe 32 of separator 40 are sent to waste, preferably with the liquid effluent from pipe 98 of the liquid-gas separator 97. The chlorine and caustic soda in the two waste streams would react to form sodium hypochlorite, a disinfectant. (The connection between pipe 41 and pipe 45 is not shown.) Similarly, the hydrogen issuing from pipe 47 of separator 97 would, if of approved quality, be mixed with the hydrogen in pipe 43 of separator 42. Otherwise the hydrogen from pipe 47 would be vented to the atmosphere. (The connection between pipes 47 and 43 not shown.)

Following the usual convention, influent pipes from the header pipe 30 carrying sea water to compartments 35, 7A, 7B, 7C, etc. are designated 22, 22A, 22B, 22C, etc. and influent pipes from the header 31, carrying recovered water to compartments 46A, 46B, 46C, etc. are designated 23A, 23B, 23C, etc. respectively.

In similar fashion, pipes carrying effluent from compartments 46A, 46B, 46C, etc. to separator 42 are designated 26A, 26B, 26C, etc. respectively; and pipes carrying effluent from compartments 7A, 7B, 7C, etc. to separator 44 are designated 27A, 27B, 27C, etc. respectively.

It will be noted that wires 37 connecting the secondary electrodes 16 and 15 are arranged so that the current interrupter 91 will pulse the current between all electrodes 16 and all electrodes 15 simultaneously. It may again be stated that out-of-phase pulsing of current between the primary electrodes 13 and 14, and the secondary electrodes 16 and 15 is preferred, but not vital to the functioning of the multi-cell unit of FIG. 3.

If the product water effluent from separator 44 has an unacceptably high salt content, said water substituted for sea water, may be re-electrolyticdialyzed in units similar to that of FIG. 3. Methods whereby said retreatment is achieved are described on page 253 and following pages of the volume by Spiegler mentioned above. Said methods are referred to as "staging".

When, after further electrolyticdialysis, the salt content of the product water is acceptable, said water may be freed of dissolved chlorine and acids as described with reference to FIG. 5, and then sent to storage.

When further electrolyticdialysis is necessary and cationic membranes 63 are used in the further electrolyticdialysis, it is preferred to free the product water prior to said further treatment of chlorine and hypochlorous acid to protect the less corrosion resistant membranes 63, dissolved chlorine and hypochlorous acid being removed as described with reference to FIG. 5.

The diffusion barriers 61 of FIG. 3 are depicted as made of packed fiber. Glass fiber may be used or as mentioned fritted glass or other porous, corrosion resistant material may also be used as diffusion barrier means. The brackets 87 securing barriers 61 may be made of sheets of plastic such as polypropylene or teflon which will resist corrosion, and said sheets may be cemented to the gaskets 12 with an appropriate adhesive.

In re-electrolyticdialyzing said product water to reduce its salt content, the said product water is pumped thru line 30 by pump 28 in place of the sea water originally so pumped. The balance of the said re-electrolyticdialysis is identical with that originally used with sea water.

Figure 6:
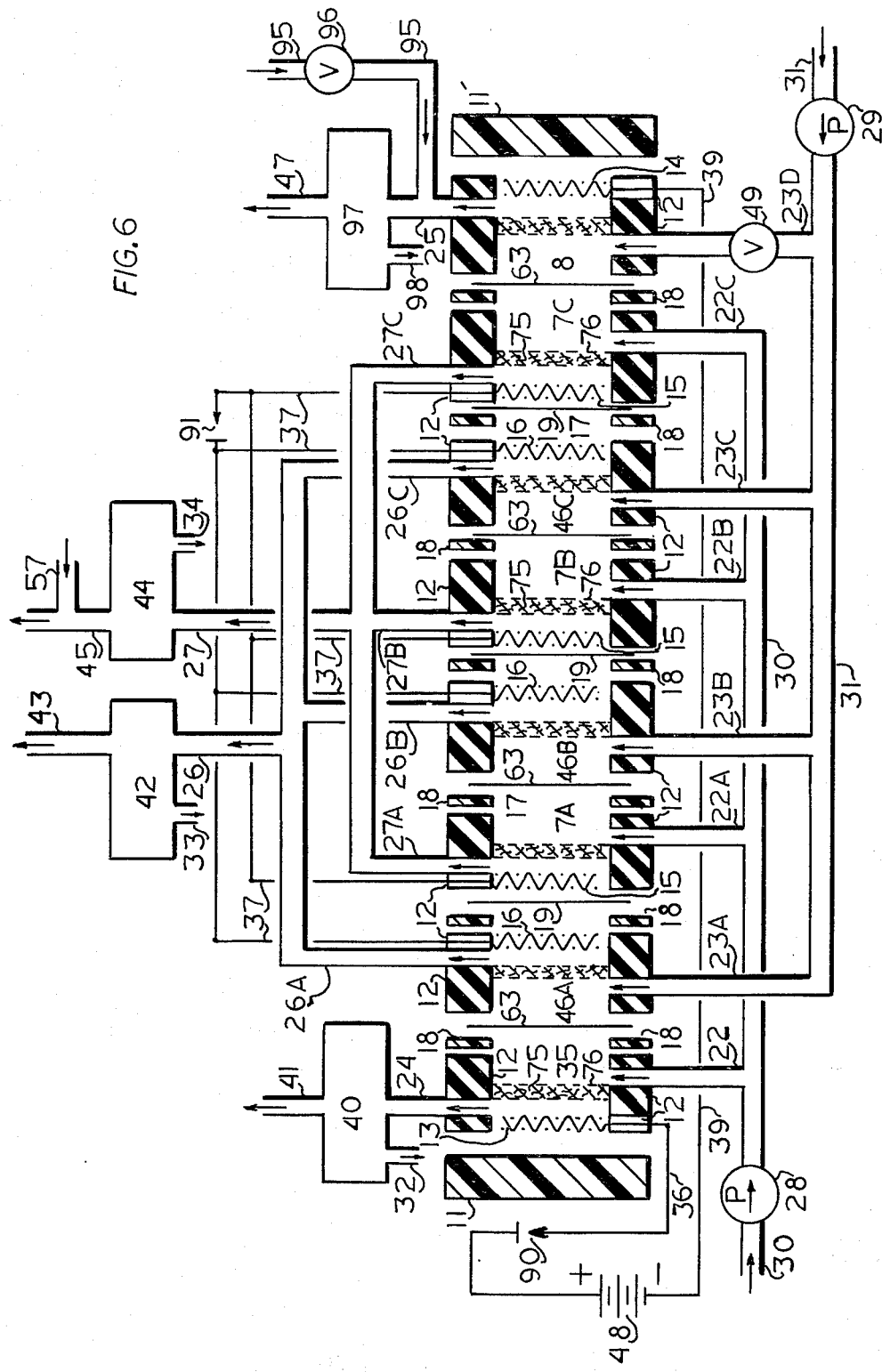
FIG. 6 is an exploded diagrammatic representation, on an elevational cross-section, of several electrodialytic cells illustrating a variation of the cell of FIG. 1, wherein both primary and secondary electrodes are placed in apposition to the membranes of said cell, as depicted in FIG. 1, said cells being functionally joined.

Reference is now made to FIG. 6. The main variation distinguishing the arrangement of the parts of FIGS. 3 and 6 is that all the secondary electrodes 16 and 15 are brought in apposition to the primary electrodes 13 and 14; also the diffusion barriers 75 are repositioned to protect the membranes 63. Barriers 75 may be constructed in the same manner as the barriers 61 of FIG. 3, and said barriers 75 are secured by brackets 76 made of perforated sheets of corrosion resistant plastic. Brackets 76 may be affixed to gaskets 12 by cement or mechanically by stainless steel rivets. All cells in FIG. 6 are functionally joined.

As in the case of the multi-cell electrolyticdialysis unit of FIG. 3, the number of cells of the unit depicted in FIG. 6 is not limited to the number of cells shown in said FIG. 6, but in commercial units, cells numbering in the hundreds may be used in a single unit as depicted in said Figure.

Also, as mentioned with reference to FIG. 3, out-of-phase pulsing of current between primary electrodes 13 and 14, and the secondary electrodes 16 and 15 is preferred but not necessary to the functioning of the multi-cell unit of FIG. 6.

Salt concentration in the product water from pipe 34 of separator 44, if not low enough after a single pass of sea water thru the unit of FIG. 6, may be retreated as described with reference to FIG. 3. Acceptable product water may be treated to remove chlorine and hypochlorous acid as described with reference to FIG. 5; and said contaminants should be removed also when retreating unacceptable product water in further units of FIG. 6 to protect the membranes 63.

Spacer elements 62 of FIG. 3 are not shown in the cells of FIG. 6, but said elements 62 may, of course, be used also before the membranes 63 of FIG. 6.

Cationic membranes 63 which, as mentioned, are less costly than the Nafion membranes used in FIG. 1, are made by Ionics, Inc. of Watertown, Massachusetts, and by the Asahi Chemical Industry Co. LTD. with an office in New York City, among others.

Voltages and current densities used in applications of the electrolyticdialysis process are in the range used by electrodialysis processes in present vogue, which, however does not limit the new process to these said ranges.

Instead of the ion selective membranes 20, 21, and 63 being cationic membranes, said numbered membranes may be of the anionic variety. This last variation, however, would in most cases be undesirable because of increased fouling of anionic membranes and because of difficulties in product separation in most cases.

Instead of sea water, brackish water may be used in the present process. Also concentrated sodium chloride solutions, such as the approximately 28 to 30% sodium chloride solutions used in electrolysis cells may be used in the present process.

Electrolyte solutions other than those of sodium chloride may also be used in the present process.

For example, a cupric chloride solution, 0.5 normal, was electrolytically dialysed in the new process. The cupric chloride solution was pumped thru the electrolyticdialysis apparatus of the present invention instead of sea water, and deionized water was used instead of recovered water; the cupric chloride solution was used in both end compartments 35 and 8. The recovered products were chlorine gas, and copper which was deposited on copper screens used as electrodes instead of the stainless steel screen cathodes 14 and 16. The copper screen electrodes were weighed before and after the run to obtain the weight of copper deposited. No hydrogen was evolved since there was no reaction between the elemental copper deposited and the water used. The use of the liquid-gas separator 42 was not required, the deionized water being recirculated without use of said separator.

It should be noted that the isolated groups of ions of opposite charge, for example, a group of positively charged sodium ions and a separated group of negatively charged chlorine ions, represent an electrical battery with, in the said example, a voltage of about four volts. The said voltage is adequate to overcome ordinary resistance to mutual electrical discharge of the two said groups of ions. However, if desired to facilitate the said mutual discharge, additional voltage may be impressed on the electrical connection between the two said groups of ions during said mutual discharge.

The diffusion barriers 61 of FIG. 3, and barriers 75 of FIG. 6 may be constructed as indicated above, or said barriers may consist of check valves with bodies and discs of suitable plastic, or construction of said barriers may be of any other suitable design.

In experimental work on the electrolyticdialysis process D.C. voltage of one volt per cationic membrane and a current density of 20 milli-amperes per square centimeter ($ma/cm^2$) were used.

To compare energy requirements per unit weight of salt concentrated in an electrodialysis unit with energy requirements for the same combined weight of sodium hydroxide and chlorine made in an electrolyticdialysis unit, bearing in mind that 42.5% of the weight of the sodium hydroxide comes from water and should be deducted, an electrodialysis unit and an electrolyticdialysis unit of the same dimensions were used. The electrodialysis unit had an anionic membrane in place of the ion-impervious membrane of the electrolyticdialysis unit. The effective area of each membrane in both units was 28 $cm^2$, compartment areas were 40.5 $cm^2$, and there was a separation of membranes of 1.5 cm in both units. All compartments of all cells in the electrodialysis unit had sea water influent; the electrolyticdialysis unit had sea water and distilled water influents alternating in the compartments of said unit, with sea water in one end compartment, and at start-up, 3.5% caustic soda solution in the other end compartment of said unit, after which distilled water was influent to the caustic containing compartment. All influents to both units were regulated to the same rate. A slow rate of 0.1 cubic centimeter per minute was chosen. Measurements of weights of salt concentration and of sodium hydroxide and chlorine formation were started after the units had come to equilibrium conditions. In the case of the electrolyticdialysis unit about one half hour was required for equilibrium to be established. Weights of salt concentrated and combined weights of sodium hydroxide and chlorine were approximately equal per unit time of operation of each of the said units. One volt per membrane pair, and a current density of 20 ma/cm$^2$ was used in the electrodialysis unit. Energy at the rate stated above was used in the electrolyticdialysis unit. Electrical resistance and ion transport of all membranes were matched as closely as possible. Spacers and diffusion barriers were omitted, and the electrolyticdialysis unit was modeled after the variation of FIG. 6, with no pulsing of any current.

The essence of this invention is:

A synthesis of prior art electrodialysis and electrolysis which comprises segregation of ions of like charge from ions of the opposite charge contained in an electrolyte solution, said solution being contained in each cell of a group of functionally joined cells, each of said cells being separated into two liquid-tight compartments by a dielectric membrane which will allow passage of an electric field but which is impervious to ion transport, and each of said cells being provided with an ion-selective membrane dividing each of said cells into a compartment filled with said electrolyte solution and a neighboring cell into a compartment filled with the solvent of said solution, by subjecting the said solution in said cells to the action of a common direct electric field, whereby said segregation is effected thru the combined functioning of both the said ion-selective and the said ion-impervious membranes, allowing the segregated groups of ions to mutually electrically discharge themselves thru an electrically conductive means, said last means impressing no voltage of its own on the said segregated groups of ions.

The above combination may be provided by means other than those described in the preferred embodiments and still lie within the scope of this invention.

I claim:

1. The method for electrolytically dialyzing the solute of a solution of an electrolyte, said solution being contained in each cell of a group of functionally joined cells, each of said cells being provided with an ion-selective membrane, and each of said cells being compartmented by an ion-impervious dielectric membrane, which comprises subjecting the said solution to the action of a common direct electric field in such manner as to cause migration of ions of like charge of said solution thru said ion-selective membrane into a compartment of a neighboring cell whereas ions of opposite charge are sequestered by said ion-impervious membrane, allowing mutual electric discharge between the migrated and the sequestered groups of ions by electrically conductive means, recovering the resulting atoms, molecules, and reaction products of said atoms and molecules with the solvent of said solution, and also recovering a portion of the said solvent having a changed concentration of ions.

2. The method of claim 1 wherein the said ion-selective membrane is a cationic membrane.

3. The method of claim 1 wherein the solution of electrolyte is sea water.

4. The method of claim 3 wherein the recovered products are chlorine, caustic soda solution, hydrogen, and desalinated water.

5. The method of claim 1 wherein the said common direct electric field is produced by a pair of primary electrodes, one of the primary electrodes being positioned at each adjunct end of the said group of functionally joined cells, one of the said primary electrodes being in contact with the said electrolyte solution and the other primary electrode being in contact with the solvent of the said electrolyte solution, the said pair of primary electrodes being connected to a source of direct current voltage.

6. The method of claim 1 wherein the said electrically conductive means whereby mutual electric discharge of the said ions of opposite charge is effected are pairs of secondary electrodes, one of each of said pairs of secondary electrodes being positioned in each of the said compartments of the cells of claim 1, each of the pairs of secondary electrodes being connected by an electrically conducting wire.

7. The method of claim 1 wherein the electric circuit involved in production of said common direct electric field, and the circuit involved in said mutual electric discharge of the ions of opposite charge are both provided with current interrupters, the interruption of the current in the two said circuits being out-of-phase with each other.

8. The method of claim 1 wherein diffusion barriers are employed to protect the said ion-selective membranes from the corrosive action of products resulting from said method.

9. The method of claim 1 wherein spacer elements are employed to improve the efficiency of said method.

10. The method of claim 1 wherein the said ion-impervious membrane is composed of Teflon.

11. The method of claim 1 wherein the said solution of an electrolyte is brackish water.

* * * * *